United States Patent
Trowbridge

(10) Patent No.: US 6,926,264 B1
(45) Date of Patent: Aug. 9, 2005

(54) AIR SPRING UPPER RETAINER

(75) Inventor: Mark Guy Trowbridge, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/009,695

(22) PCT Filed: May 28, 1999

(86) PCT No.: PCT/US99/11772

§ 371 (c)(1),
(2), (4) Date: Nov. 6, 2001

(87) PCT Pub. No.: WO00/73676

PCT Pub. Date: Dec. 7, 2000

(51) Int. Cl.[7] .................................................. F16F 9/05
(52) U.S. Cl. ................................ 267/64.27; 267/64.11; 267/122
(58) Field of Search ........................... 267/122, 35, 66, 267/64.11–64.28; 280/124.157, 124.158; 92/98 D, 103

(56) References Cited

U.S. PATENT DOCUMENTS

| | | | |
|---|---|---|---|
| 2,977,134 A | 3/1961 | Helling .......................... 280/124 |
| 3,777,843 A | 12/1973 | Fair et al. ................ 181/0.5 VM |
| 3,790,147 A | 2/1974 | Owen .......................... 267/65 B |
| 4,342,264 A | 8/1982 | Hindin et al. ............. 105/215 C |
| 4,493,481 A * | 1/1985 | Merkle ....................... 267/64.27 |
| 4,718,650 A | 1/1988 | Geno .......................... 267/64.27 |
| 4,733,876 A | 3/1988 | Heider et al. ..................... 280/6 |
| 4,787,607 A | 11/1988 | Geno et al. ............... 267/64.27 |
| 4,852,861 A | 8/1989 | Harris ....................... 267/64.27 |
| 4,946,144 A * | 8/1990 | Geno et al. ............... 267/64.27 |
| 4,980,823 A * | 12/1990 | Liu .............................. 711/136 |
| 5,203,585 A | 4/1993 | Pierce .......................... 280/713 |
| 5,269,496 A | 12/1993 | Schneider ................ 267/64.27 |
| 5,326,082 A | 7/1994 | Ecktman et al. .......... 267/64.27 |
| 5,382,006 A | 1/1995 | Arnold ...................... 267/64.27 |
| 5,403,031 A | 4/1995 | Gottschalk et al. ......... 280/704 |
| 5,464,245 A | 11/1995 | Vogler ......................... 280/720 |
| 5,467,971 A | 11/1995 | Hurtubise et al. ........... 267/220 |
| 5,535,994 A * | 7/1996 | Safreed, Jr. ................. 267/122 |
| 5,934,652 A * | 8/1999 | Hofacre et al. ........... 267/64.23 |
| 6,250,613 B1 * | 6/2001 | Koeske et al. ............. 267/122 |
| 6,386,524 B1 * | 5/2002 | Levy et al. ............... 267/64.21 |

FOREIGN PATENT DOCUMENTS

| | | | | |
|---|---|---|---|---|
| EP | 0123171 | | 10/1984 | ............. F16F 9/04 |
| EP | 0295392 | | 12/1988 | ............. F16F 9/04 |
| EP | 0306040 | | 3/1989 | ............. F16F 9/04 |
| EP | 0590317 | | 4/1994 | ........... F16B 21/06 |
| EP | 1041308 A1 * | | 10/2000 | |
| FR | 2827551 | * | 7/2002 | |
| WO | WO 00/73676 A1 * | | 12/2000 | |

* cited by examiner

*Primary Examiner*—Douglas C. Butler
(74) *Attorney, Agent, or Firm*—Nancy T. Krawczyk

(57) ABSTRACT

An air spring (1) has a cylindrical flexible sleeve (2) secured at each end to form a fluid chamber (14). One end (6) of the sleeve (2) is secured to a retainer (8). The retainer (8) has a ribbed reinforcement structure (16) which allows the air spring (1) to be directly mounted to a moveable part of a vehicle or other machinery. The retainer (8) has an extending mounting structure (13) on one side of the reinforcement structure (16) and a bead-seating surface (12) adjacent to the reinforcement structure (16).

10 Claims, 4 Drawing Sheets

AIR SPRING UPPER RETAINER

FIELD OF THE INVENTION

The present invention is directed toward a retainer for an air spring. More particularly, the present invention is a thermoplastic upper retainer for an air spring which provides for easy air spring assembly and mounting.

BACKGROUND OF THE INVENTION

Air springs have been used for motor vehicles and various other machines and equipment for a number of years. The springs provide cushioning between movable parts, primarily to absorb shock loads imparted thereon. The air spring consists of at least one flexible elastomeric reinforced sleeve extending between a pair of retainers, forming a pressurized chamber therein. The sleeve typically has a relatively inextensible bead core at each end for securing the sleeve to the retainers. Alternatively, the sleeve may be secured to the retainers by conventional crimping means. There may be one or more pistons associated with the air spring. The retainers also assist in securing the air spring on spaced components or parts of the vehicle or equipment by being secured to a mounting plate which is attached to the moveable part of the vehicle or machine.

The fluid in the pressurized chamber, generally air, absorbs most of the shock impressed upon or experienced by one of retainers. The retainers move towards and away from each other when the air spring is subjected to any forces.

Both upper and lower retainers are conventionally formed of stamped metal. If the air spring has a piston, the piston, upon which the lower retainer is secured, may be metal or thermoplastic. A bumper, mounted on either retainer and provided for impact absorption and transference, is usually thermoplastic or thermoelastic, depending upon the forces which will ultimately be acting on the air spring and the forces to which the bumper will be subjected.

When the air spring is mounted to a vehicle, a subassembly made from coated steel stampings and plumbing components are used to achieve the mounting attachment, air connection and airsleeve bead captivation. Such conventional mounting means are illustrated in the following U.S. Pat. Nos. 5,203,585; 5,464,245; 5,403,031, 5,346,247, and 4,733,876 (which has a two material upper retainer which has a mounting structure rising from two cojoined flat plates). Other known air springs and retainers are disclosed by U.S. Pat. No. 5,535,994 and EP 295,392.

SUMMARY OF THE INVENTION

The present invention is directed toward providing a lightweight, low cost means of easily attaching the air supply end of the air spring directly to a suspension frame rail of a vehicle.

The present invention is an improved air spring for absorbing and transmitting shock loads between parts moveable relative to one another. The air spring comprises a flexible cylindrical sleeve which is secured at each end to form a fluid chamber therein. One end of the sleeve is secured to a retainer. The retainer has a ribbed reinforcement structure which allows for direct mounting of the airspring to one of the moveable parts.

The ribbed reinforcement structure of the disclosed retainer is comprised of a plurality of ribs. In an alternative construction, the ribs may run the full length of the reinforcement structure. The ribs may also be at least two sets of ribs, with the ribs extending at different angles relative to each other.

The disclosed retainer has an axially extending mounting plate for directly mounting the air spring to the moveable part.

The disclosed retainer also has a bead seating surface. The bead seating surface is adjacent to the ribbed reinforcement structure.

The disclosed retainer is formed from a thermoplastic material having a tensile strength in the range of 1965 to 3165 kg/cm$^2$ (28,000 to 45,000 psi), and a flex strength in the range of 2810 to 4220 kg/cm$^2$ (40,000 to 60,000 psi).

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
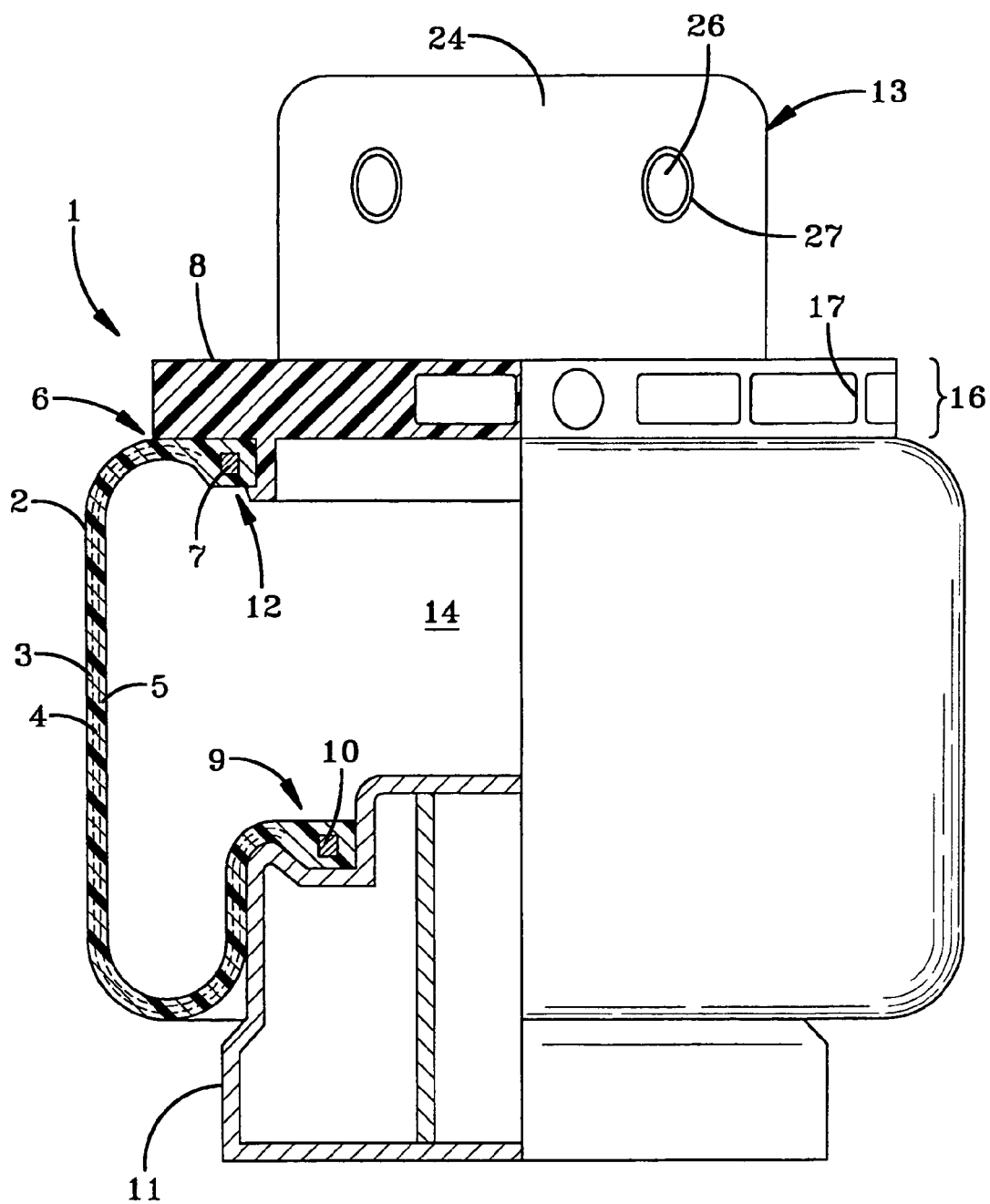
FIG. 1 is a half cross-sectional view of an air spring with the inventive upper retainer.

The present invention is illustrated within an assembled air spring 1 in FIG. 1. The air spring 1 has a cylindrical elastomeric sleeve 2. The elastomeric sleeve 2 is preferably comprised of at least 3 plies: an outer elastomeric ply 3, at least one reinforcing ply 4 formed of elastomeric embedded reinforcing cords, and an inner elastomeric ply 5. The upper end 6 of the sleeve 2 has a relatively inextensible bead 7 for securing the airsleeve 2 to the inventive upper retainer 8. The bead core 7 is at least one continuous winding of wire, preferably steel. The configuration of the bead core 7 may vary as is conventionally known. The lower end 9 of the airsleeve 2 may also be defined by a bead core 10 for securing the lower end 9 of the airsleeve 2.

The lower end 9 of the airsleeve 2 is secured to a piston 11. The lower end 9 of the airsleeve 2 may be secured in any conventional manner, including, but not limited to, crimping the lower end 9 of the airsleeve 2 to the piston or to a conventional lower retainer or by securing the bead core 10 by a lower retainer. An internal bumper may be provided for absorbing impact forces. When the air spring 1 is in use, the upper retainer 8 moves in an axial direction and the sleeve 2 travels up and down the outside of the piston 10.

The inventive upper retainer 8, seen illustrated in FIGS. 2 to 6, is a unitary article, provided with both bead seating means 12 and mounting means 13. The underside of the retainer 8 is defined by the bead seating surface 12, see FIG. 3. At the axially innermost edge of the bead seating surface 12, relative to the air chamber 14 formed within the air spring 1, is a bead retention lip 15. The bead retention lip 15 has a radial width of at most 10 mm, and is preferably in the range of 2 mm to 6 mm. The width of the bead retention lip 15 is greater than zero to prevent the bead 7 from dismounting and disengaging from the retainer 8 under low-pressure operation of the air spring 1. If the bead retention lip 15 has a radial dimension greater than 10 mm, then the bead 7 cannot be press-fitted onto the retainer 8 without damage to either the airsleeve 2 or the bead 7 due to the highly inextensible nature of the bead. In mounting the bead 7 to the retainer 8, the bead 7 is held onto the retainer 8 by the interference fit between the bead seating surface 12 and the air spring bead 7 to effect a seal. The radius of the bead seating surface 12 is less than the greatest radius of the retainer 8, but greater than the radius of the air spring bead 7.

Figure 2:
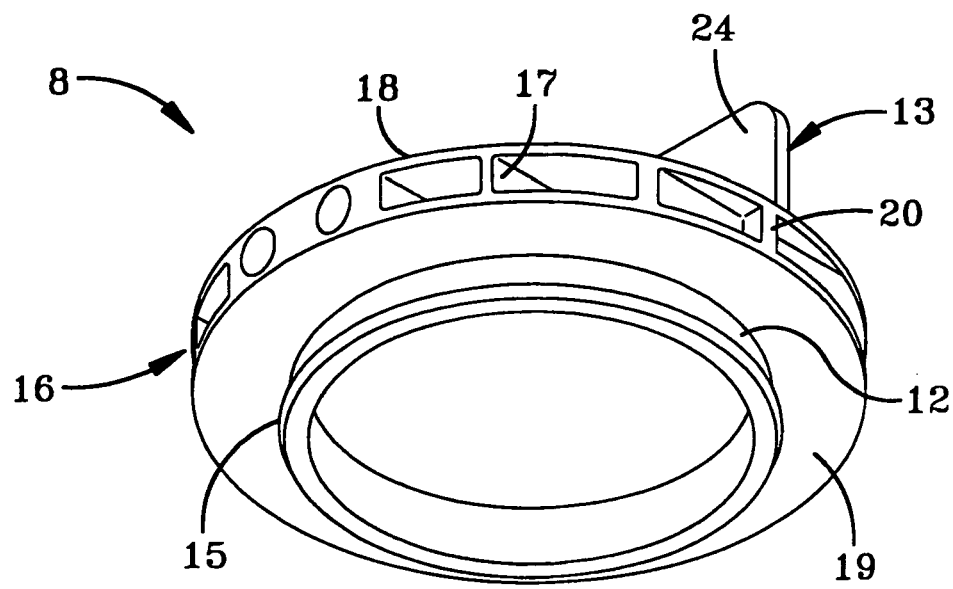
FIG. 2 is a perspective view of the inventive retainer.
Figure 3:
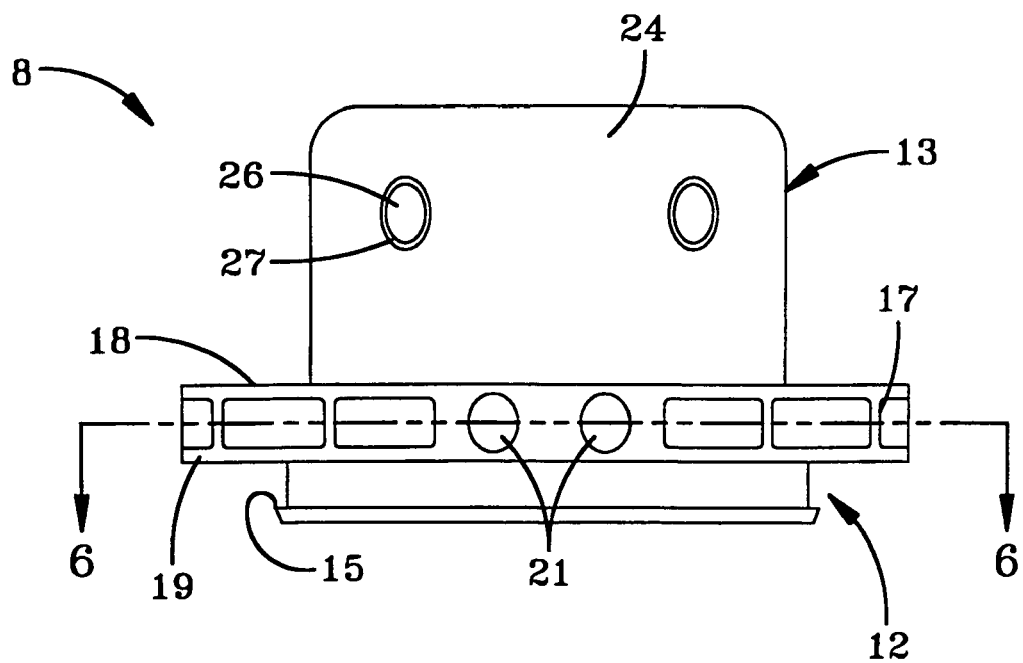
FIG. 3 is a side view of the upper retainer.
Figure 4:
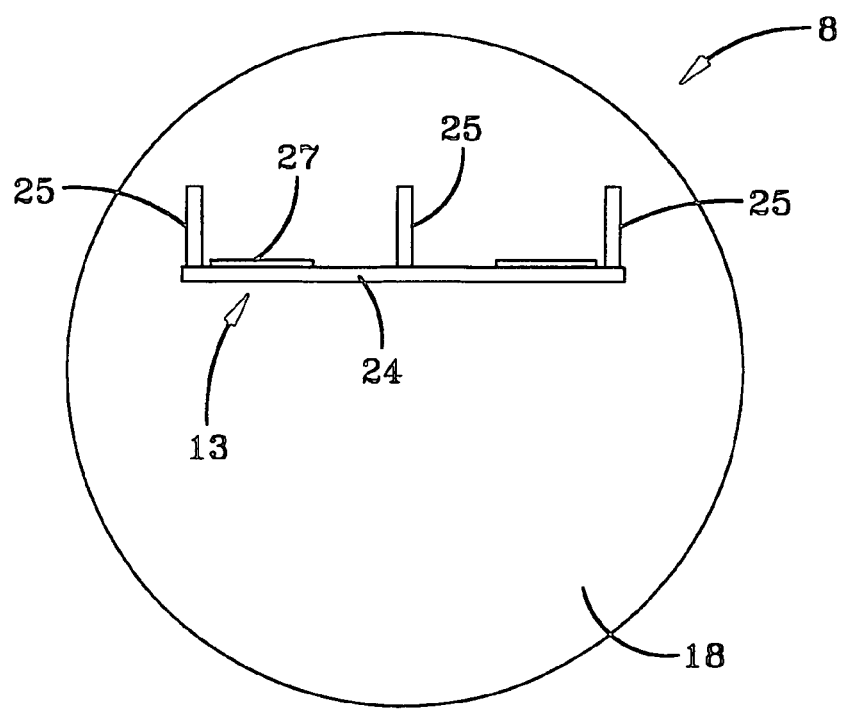
FIG. 4 is a top view of the retainer.
Figure 5:
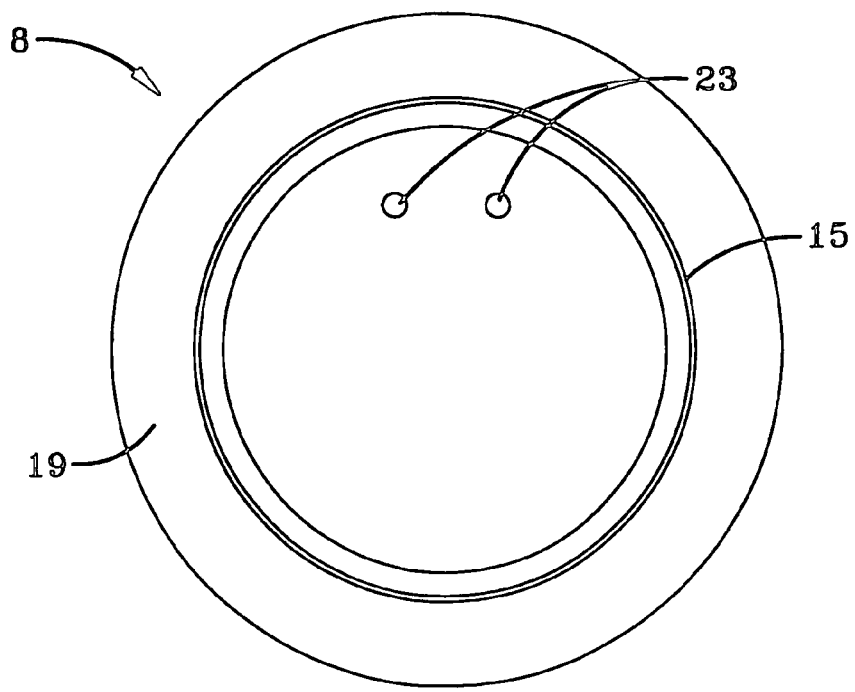
FIG. 5 is a bottom view of the retainer.
Figure 6:
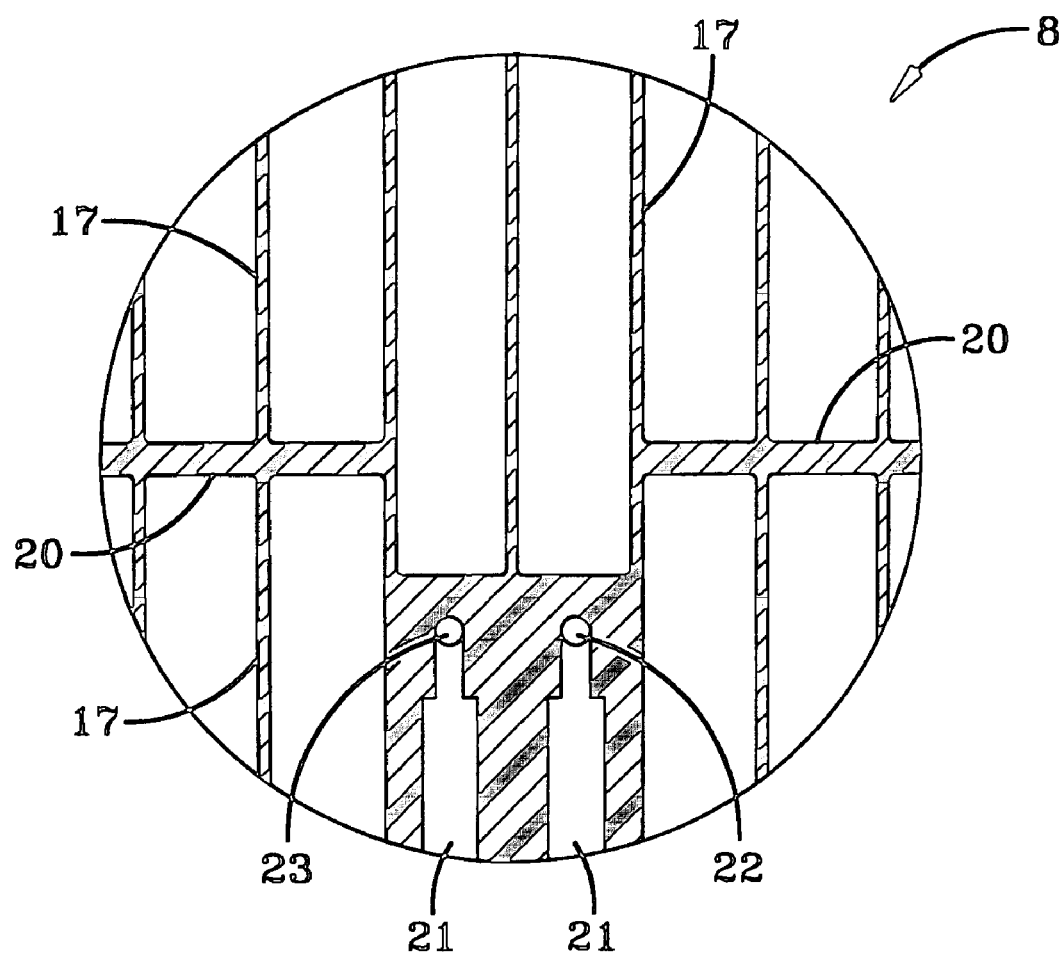
FIG. 6 is a cross-section view of the retainer through line 6—6 of FIG. 3.

The intermediate reinforcement section 16 of the air spring retainer 8 is defined by a plurality of ribs 17 which extend the length or width of the intermediate reinforcement section 16 of the retainer 8. The ribs 17 are located between the outer plate 18 and the inner plate 19. A preferred embodiment of the ribs 17 is illustrated in FIGS. 2, 3 and 6. As seen most clearly on FIG. 6, the ribs 17 extend the full length of the outer and inner plates 18,19. The ribs 17 are substantially equal in width and are equidistant from each other, forming equiwidth cavities. The ribs 17 are blended at the point of connection with the upper and lower plates 18,19. Also between the two plates 18,19 are two ribs 20 which extend perpendicular to the plurality of ribs 17. These perpendicular ribs 20 assist in providing structural support to the retainer 8.

As noted, the illustrated configuration is the preferred embodiment for the structural ribbing and air inlet means of the upper retainer 8. The ribbing 17, 20 between the upper and lower plates 18, 19 is provided for structural integrity and impact resistance. The distance between the ribs 17, and thus the relative widths of the cavities, may vary in accordance with the resulting impact forces to which the air spring 1 will be subjected. Both the ribbing 17 and perpendicular ribbing 20 may extend from either the top plate 18 or the bottom plate 19 without contacting the opposing plate. Additionally, all of the chambers may be formed with a more circular cross-section and more rounded radially inner end points than presently illustrated. The ribbing may also be provided in other configurations wherein the ribbing extends at angles relative to one another, such as in a herringbone or diamond pattern, to vary the retainer strength characteristics. The configuration of the ribbing pattern is limited solely by molding dictates.

Two adjacent air chambers 21 provide means for the flow of the pressurized fluid into and out of the pressurized chamber 14. The chambers 21 are formed with a smaller width and a lesser extending depth than the formed cavities. At the radially inner most point 22 of the fluid admitting chambers 21, the chambers 21 terminate in an orifice 23 which extends through the bottom plate 19. The stepped-in configuration of the fluid admitting chambers 21 permit a push-in fitting to be secured in the retainer 8 during a post molding action. The walls of the fluid admitting chambers 21 are shaped to match the configuration of the push-in fittings. The orifice 23 may extend through the retainer 8 in an axial direction only, as opposed to the illustrated radial/horizontal access for fluid flow. For such a construction, the entire intermediate section 16 of the retainer 8 is defined by ribbing 17, 20 and two axial extending orifices for the insertion of air fittings pass through both the upper and lower plates 18, 19.

On the axially outer side of the top plate 18, means 13 are provided for securing the air spring 1 to any vehicle frame or bracket upon which it is desired to mount the air spring 1. A unitary plate 24 is located off-centered on the top plate 18. The location of the plate 24, relative to the center of the top plate 18, as well as the height and width of the plate 24 is dependent on the vehicle frame structure on which the air spring 1 is to be mounted. The plate 24 is supported by a set of braces 25. The plate 24 and the braces 25 are formed as an integral part of the retainer 8 by molding the plate 24 with the retainer 8, welding the plate 24 to the retainer 8, or by bonding the plate 24 to the retainer 8; the plate 24 is preferably molded as an integral part of the retainer 8. The plate 24 is provided with at least one mounting hole 26. The holes 26 are reinforced with steel inserts 27 to strengthen the mounting of the air spring 1.

The retainer 8 is injection molded from a resilient material, preferably thermoplastic. Examples of applicable material include, but are not limited to, fiberglass reinforced nylon, long fiber reinforced thermoplastic, commercially available as CELSTRAN, and short fiber reinforced thermoplastic, commercially available as ZYTEL. The tensile strength of the material should be within the range of 1965 to 3165 kg/cm$^2$ (28,000 to 45,000 psi), have a flex strength in the range of 2810 to 4220 kg/cm$^2$ (40,000 to 60,000 psi), and notched izod strength of 0.117–0.703 N-m/mm (2.0 to 12.0 ft-lb/in).

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the fully intended scope of the invention as defined by the following appended claims.

What is claimed is:

1. An air spring (1) for absorbing and transmitting shock loads between parts moveable relative to one another, the air spring (1) comprising a flexible cylindrical sleeve (2) which is secured at each end to form a fluid chamber (14) therein, a piston (11), the sleeve (2) being secured at one end (6) to a retainer (8) and being secured at the opposing end (9) by the piston (11), the air spring being characterized by:

the retainer (8) being integrally formed with an intermediate ribbed reinforcement structure (16) to strengthen the retainer, allowing for direct mounting of the air spring (1) to one of the moveable parts, the intermediate ribbed reinforcement structure (16) of the retainer (8) comprising an outer plate (18) and an inner plate (19) which are parallel to each other, and a plurality of ribs (17 to 20) that extend between the outer plate (18) and the inner plate (19).

2. An air spring (1) in accordance with claim 1 wherein the retainer is further characterized by the ribs (17 or 20) extending the full width of the intermediate reinforcement structure (16).

3. An air spring (1) in accordance with claim 1 wherein the ribbed reinforcement structure (16) is further characterized by at two sets of ribs (17 or 20) extending at angles relative to each other (20 or 17).

4. An air spring (1) in accordance with claim 1 wherein the retainer (8) is further characterized by being formed from a thermoplastic material having a tensile strength in the range of 1965 to 3165 kg/cm$^2$ (28,000 to 45,000 psi), and a flex strength in the range of 2810 to 4220 kg/cm$^2$ (40,000 to 60,000 psi).

5. An improved airspring (1) in accordance with claim 4 wherein the retainer (8) is further characterized by being formed from a material selected from the following group: fiberglass reinforced nylon, long fiber reinforced thermoplastic, and short fiber reinforced thermoplastic.

6. An air spring (1) in accordance with claim 1 wherein the retainer (8) is further characterized by air inlet means (21, 23) that extends through the intermediate ribbed reinforcement structure (16).

7. An air spring (1) for absorbing and transmitting shock loads between parts moveable relative to one another, the air spring (1) comprising a flexible cylindrical sleeve (2) which is secured at each end to form a fluid chamber (14) therein, a piston (11), the sleeve (2) being secured at one end (6) to a retainer (8) and being secured at the opposing end (9) by the piston (11), the air spring being characterized by:

the retainer (8) formed as a unitary article and comprising a bead seat means (12) for securing the one end (6) of the sleeve (2), mounting means (13) for direct mounting of the air spring (1) to one of the moveable parts, and an intermediate ribbed reinforcement structure (16) located between the bead seat means (12) and the mounting means (13).

8. An air spring (1) in accordance with claim 7 wherein the retainer is further characterized by the intermediate ribbed reinforcement structure (16) comprising a plurality of extending ribs (17 or 20).

9. An air spring (1) in accordance with claim 7 wherein the intermediate ribbed reinforcement structure (16) has ribs (17 or 20) that extend the full width of the intermediate reinforcement structure (16).

10. An air spring (1) in accordance with claim 7 wherein the intermediate ribbed reinforcement structure (16) has two sets of ribs (17 or 20) extending at angles relative to each other (20 or 17).

* * * * *